US012664628B2

(12) United States Patent
Singh et al.

(10) Patent No.: US 12,664,628 B2
(45) Date of Patent: Jun. 23, 2026

(54) DEVICE AND METHOD FOR SURROUND VIEW CAMERA SYSTEM WITH REDUCED MANHATTAN EFFECT DISTORTION

(71) Applicant: Robert Bosch GmbH, Stuttgart (DE)

(72) Inventors: Vicky Ranveer Singh, Canton, MI (US); Marwan Reyadh Shaker Waheed, Farmington Hills, MI (US); Ratheesh Ravindran, Troy, MI (US); Jamal Eddin Ammar, Dearborn Heights, MI (US); Vincent Quoc Le, Dearborn, MI (US); William John Hallendy, Chesterfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/757,904

(22) Filed: Jun. 28, 2024

(65) Prior Publication Data

US 2025/0095121 A1      Mar. 20, 2025

Related U.S. Application Data

(63) Continuation-in-part of application No. 18/468,322, filed on Sep. 15, 2023, now Pat. No. 12,464,247.
(Continued)

(51) Int. Cl.
*G06T 5/80*        (2024.01)
*B60R 1/27*        (2022.01)
(Continued)

(52) U.S. Cl.
CPC ................. *G06T 5/80* (2024.01); *B60R 1/27* (2022.01); *G06T 3/4038* (2013.01); *G06T 7/20* (2013.01);
(Continued)

(58) Field of Classification Search
None
See application file for complete search history.

(56) References Cited

U.S. PATENT DOCUMENTS 6,172,601 B1      1/2001   Wada et al.
8,295,644 B2     10/2012   Shulman et al.
(Continued)

FOREIGN PATENT DOCUMENTS

JP       2002-373327 A    12/2002
WO       2023/028614 A1    3/2023

OTHER PUBLICATIONS

Morozov Automotive, Bird's Eye View Backup System With Just One Camera, ATOTO AC-HD03, Youtube, Aug. 30, 2020, https://www.youtube.com/watch?v=oFqOqVP4ZTU (3 pages).
(Continued)

*Primary Examiner* — Talha M Nawaz
(74) *Attorney, Agent, or Firm* — Maginot, Moore & Beck LLP

(57)        ABSTRACT

A method of operating a surround view camera system for a vehicle includes generating first image data at a first time using a first imaging device operably connected to the vehicle, and generating second image data at a second time using a second imaging device operably connected to the vehicle. The second time is different from the first time, and the second imaging device different from the first imaging device. The method also includes identifying distorted object data in the second image data using a processor configured to receive the first image data and the second image data. The distorted object data corresponds to a predetermined object in a surroundings of the vehicle. The method includes identifying non-distorted object data in the first image data using the processor. The non-distorted object data corresponds to the predetermined object.

20 Claims, 6 Drawing Sheets

Related U.S. Application Data

(60) Provisional application No. 63/662,278, filed on Jun. 20, 2024, provisional application No. 63/662,287, filed on Jun. 20, 2024.

(51) Int. Cl.

| | |
|---|---|
| *G06T 3/4038* | (2024.01) |
| *G06T 7/20* | (2017.01) |
| *G06V 20/58* | (2022.01) |
| *H04N 23/698* | (2023.01) |

(52) U.S. Cl.
CPC ........... *G06V 20/58* (2022.01); *H04N 23/698* (2023.01); *B60R 2300/105* (2013.01); *B60R 2300/303* (2013.01); *G06T 2207/30261* (2013.01)

(56) References Cited

U.S. PATENT DOCUMENTS

| | | | |
|---|---|---|---|
| 10,259,390 B2 | 4/2019 | Zhang et al. | |
| 10,515,485 B2 * | 12/2019 | Mallinson .............. | G02B 26/10 |
| 10,899,277 B2 | 1/2021 | Goseberg et al. | |
| 11,220,216 B2 | 1/2022 | Murad et al. | |
| 11,380,046 B2 | 7/2022 | Dabral et al. | |
| 11,465,560 B2 | 10/2022 | Lu et al. | |
| 11,820,423 B2 | 11/2023 | Okouneva et al. | |
| 11,843,865 B2 | 12/2023 | Hu et al. | |
| 11,872,939 B2 | 1/2024 | Lu et al. | |
| 2012/0176296 A1 * | 7/2012 | Border ................. | G02B 27/017 |
| | | | 345/8 |
| 2017/0341582 A1 | 11/2017 | Friebe et al. | |
| 2019/0349571 A1 | 11/2019 | Herman et al. | |
| 2020/0204732 A1 * | 6/2020 | Yadav ....................... | B60R 1/27 |
| 2023/0061195 A1 * | 3/2023 | Quinton ................. | G06F 16/50 |
| 2023/0096414 A1 * | 3/2023 | Nakahara .............. | G03B 43/00 |
| | | | 348/148 |
| 2023/0099248 A1 | 3/2023 | Lu et al. | |
| 2023/0166614 A1 * | 6/2023 | Lee ......................... | H02J 7/342 |
| | | | 701/41 |
| 2023/0182723 A1 * | 6/2023 | Lim .................... | B60W 30/143 |
| | | | 701/301 |
| 2025/0095121 A1 * | 3/2025 | Singh ........................ | G06T 5/80 |

OTHER PUBLICATIONS

ATOTO, ATOTO AC-HD03LR 720P Rearview Backup Camera (180° Wide-Angle), for ATOTO S8 Models only, VSV (Virtual Surround-View) Parking, LRV (Live Rear-View), Night Vision and Waterproof, https://www.myatoto.com/index/productDetail?productId=1585249312158875650&country=US (12 Pages).

* cited by examiner

DEVICE AND METHOD FOR SURROUND VIEW CAMERA SYSTEM WITH REDUCED MANHATTAN EFFECT DISTORTION

This application is a continuation-in-part application of U.S. patent application Ser. No. 18/468,322, filed on Sep. 15, 2023. This application claims the benefit of priority to (i) U.S. provisional application Ser. No. 63/662,278, filed on Jun. 20, 2024, and (ii) U.S. provisional application Ser. No. 63/662,287, filed on Jun. 20, 2024. The complete subject matters and disclosures of each of the above-mentioned patent applications are hereby incorporated herein by reference, in their entireties.

FIELD

This disclosure relates to the field of camera systems for vehicles and, in particular, to generating images of the surroundings of a vehicle to assist with operating the vehicle.

BACKGROUND

Vehicles, such as passenger cars, trucks, and commercial vehicles, typically include at least one camera mounted on a body of the vehicle. For example, some passenger cars include a front view camera, a left view camera, a right view camera, and a rearview camera. Images generated by the cameras are typically shown on a display screen included as part of the infotainment system of the vehicle.

One approach taken by some automakers and original equipment manufacturers (OEMs) is to combine the images from the front view camera, the left view camera, the right view camera, and the rearview camera into a combined image that approximates an aerial view of the surroundings of the vehicle. The aerial view is also referred to as a top view, a surround view, a bird's eye view, and a 360° view. In addition to showing the surroundings of the vehicle on the display screen, the surround view also typically includes an icon representing the vehicle as viewed from above that is superimposed on the combined image, such that the operator of the vehicle can view the position of the vehicle relative to the obstacles in the surroundings. The surround view is typically helpful for operators of the vehicle to navigate the vehicle in the forward direction and the reverse direction in avoidance of the obstacles.

An issue encountered with some surround view systems, is that certain obstacles are shown with a distorted appearance. For example, depending on the size and position of an obstacle relative to the corresponding camera or cameras, the obstacle may have an appearance in the combined surround view image that does not correspond to the actual size and position of the obstacle. As a result, an operator of the vehicle may misjudge the position of the vehicle relative to the obstacle and/or may misjudge the location of the obstacle relative to the vehicle.

Based on the above, an alternative solution is desirable for surround view camera systems that shows the obstacles in the surroundings of the vehicle in a manner corresponding to the actual size and position of the obstacles without distorting the obstacles.

SUMMARY

According to an exemplary embodiment of the disclosure, a method is for operating a surround view camera system for a vehicle. The method includes generating first image data at a first time using a first imaging device operably connected to the vehicle, and generating second image data at a second time using a second imaging device operably connected to the vehicle. The second time is different from the first time, and the second imaging device is different from the first imaging device. The method further includes identifying distorted object data in the second image data using a processor configured to receive the first image data and the second image data. The distorted object data corresponds to a predetermined object in a surroundings of the vehicle. The method includes identifying non-distorted object data in the first image data using the processor, the non-distorted object data corresponding to the predetermined object, and generating composite surround view image data using the processor by replacing the distorted object data with the non-distorted object data. The composite surround view image data corresponds to a composite surround view image of the surroundings of the vehicle. The method also includes operating the vehicle to avoid the predetermined object based on the composite surround view image data.

According to another exemplary embodiment of the disclosure, a surround view camera system for a vehicle includes a first imaging device, a second imaging device, a perception sensor system, and a processor. The first imaging device is mounted on the vehicle and is configured to generate first image data at a first time of a surroundings of the vehicle. The second imaging device is mounted on the vehicle and is configured to generating second image data of the surroundings of the vehicle at a second time different from the first time. The perception sensor system is configured to detect a plurality of objects in the surroundings of the vehicle. The processor is operably connected to the first imaging device, the second imaging device, and the perception sensor system. The processor is configured to receive the first image data and the second image data, to identify a predetermined object of the plurality of objects detected by the perception sensor system, and to identify distorted object data in the second image data. The distorted object data corresponds to the predetermined object. The processor is further configured to identify non-distorted object data in the first image data, the non-distorted object data corresponding to the predetermined object, and to generate composite surround view image data by replacing the distorted object data with the non-distorted object data. The composite surround view image data corresponds to a composite surround view image of the surroundings of the vehicle. The vehicle is operated to avoid the predetermined object based on the composite surround view image data.

BRIEF DESCRIPTION OF THE FIGURES

The above-described features and advantages, as well as others, should become more readily apparent to those of ordinary skill in the art by reference to the following detailed description and the accompanying figures in which.

Figure 1:
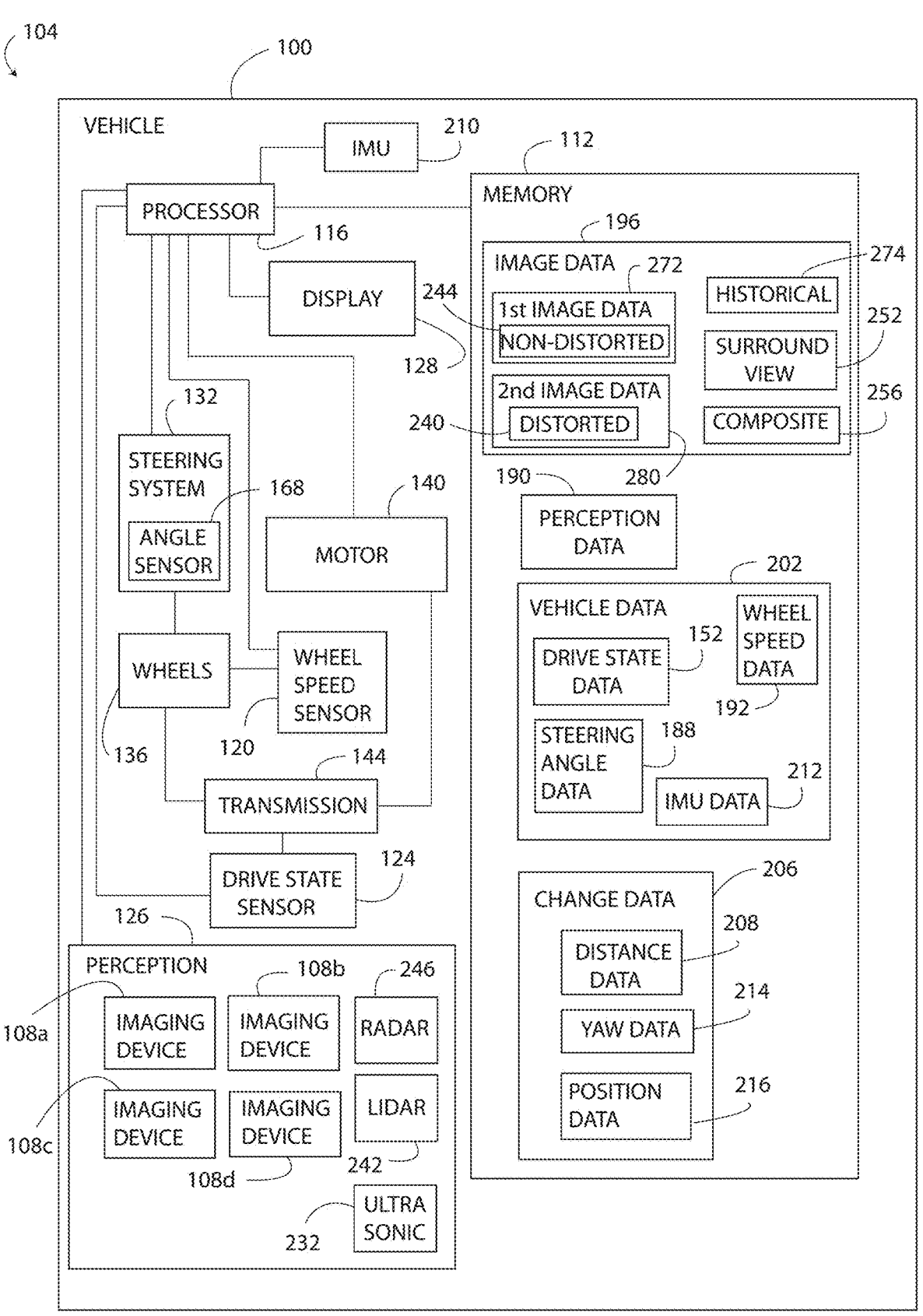
FIG. 1 is a block diagram of a vehicle including a surround view camera system, as disclosed herein.
Figure 2:
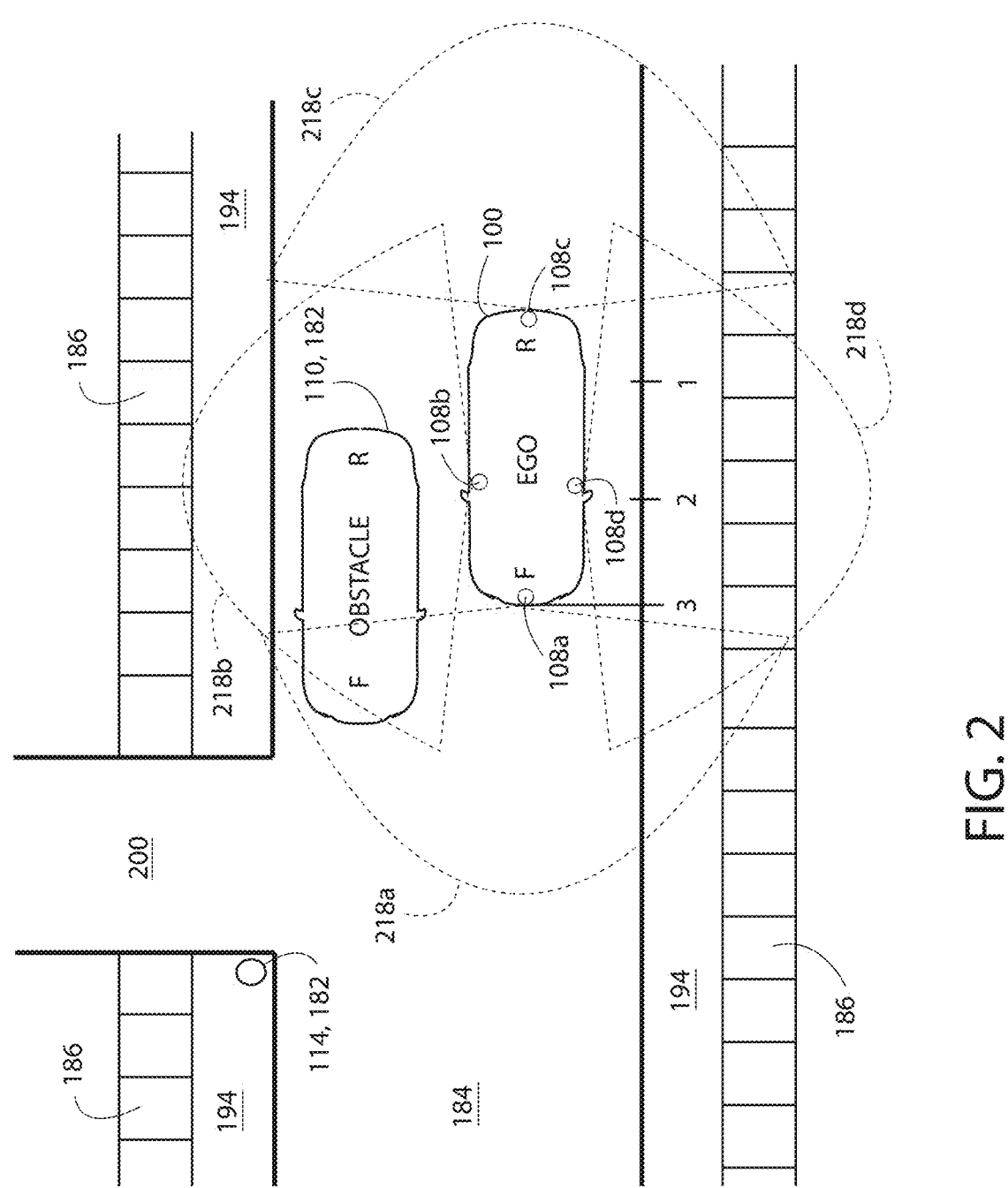
FIG. 2 is a block diagram showing an aerial view of a traffic situation including the vehicle of FIG. 1 positioned on a street and driving towards a parked vehicle that is an exemplary predetermined object or obstacle.
Figure 4:
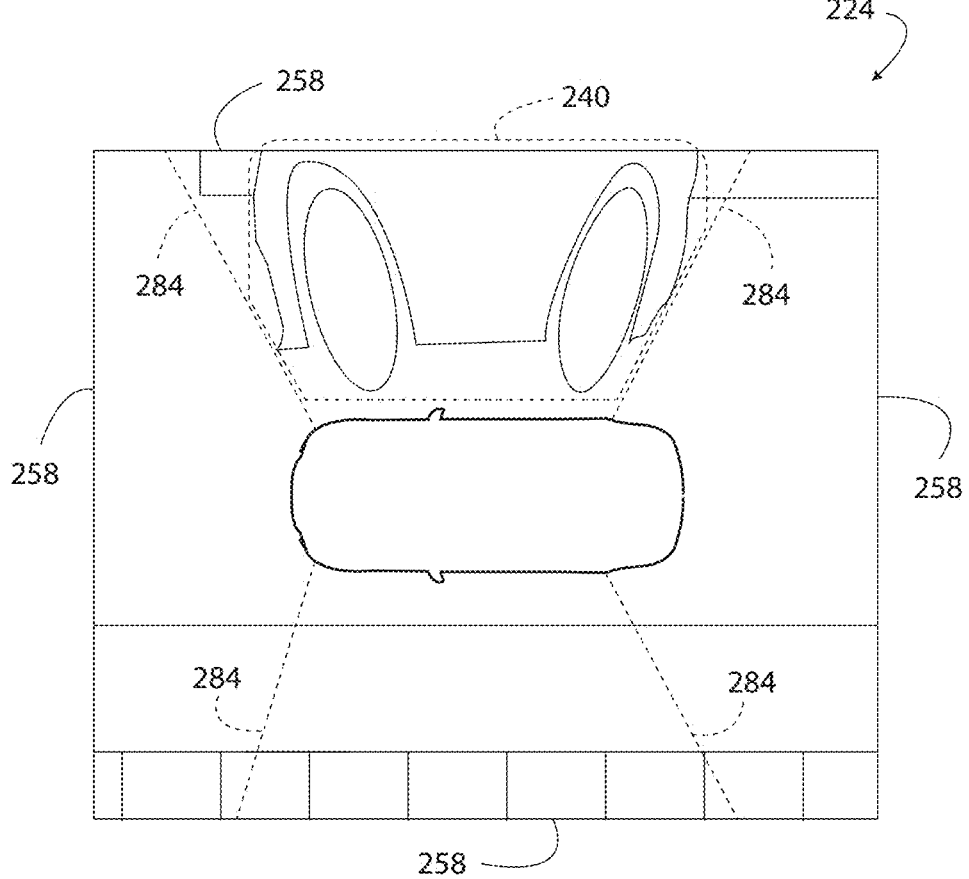
FIG. 4 illustrates a surround view image generated by the surround view camera system of the vehicle of FIG. 1 according to a Live View approach, the surround view image includes distorted object data representing the predetermined object of FIG. 2.
Figure 5:
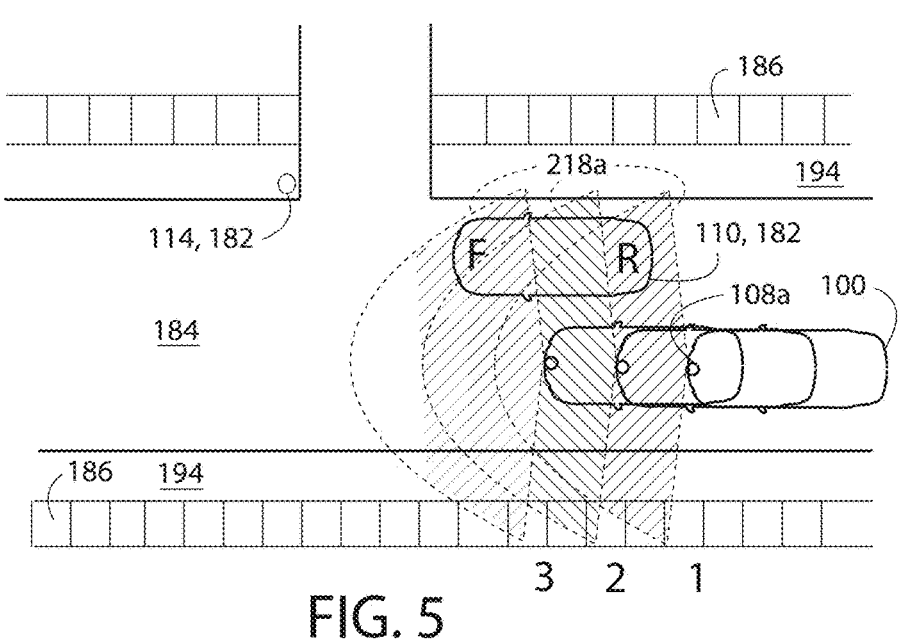
Figure 6:
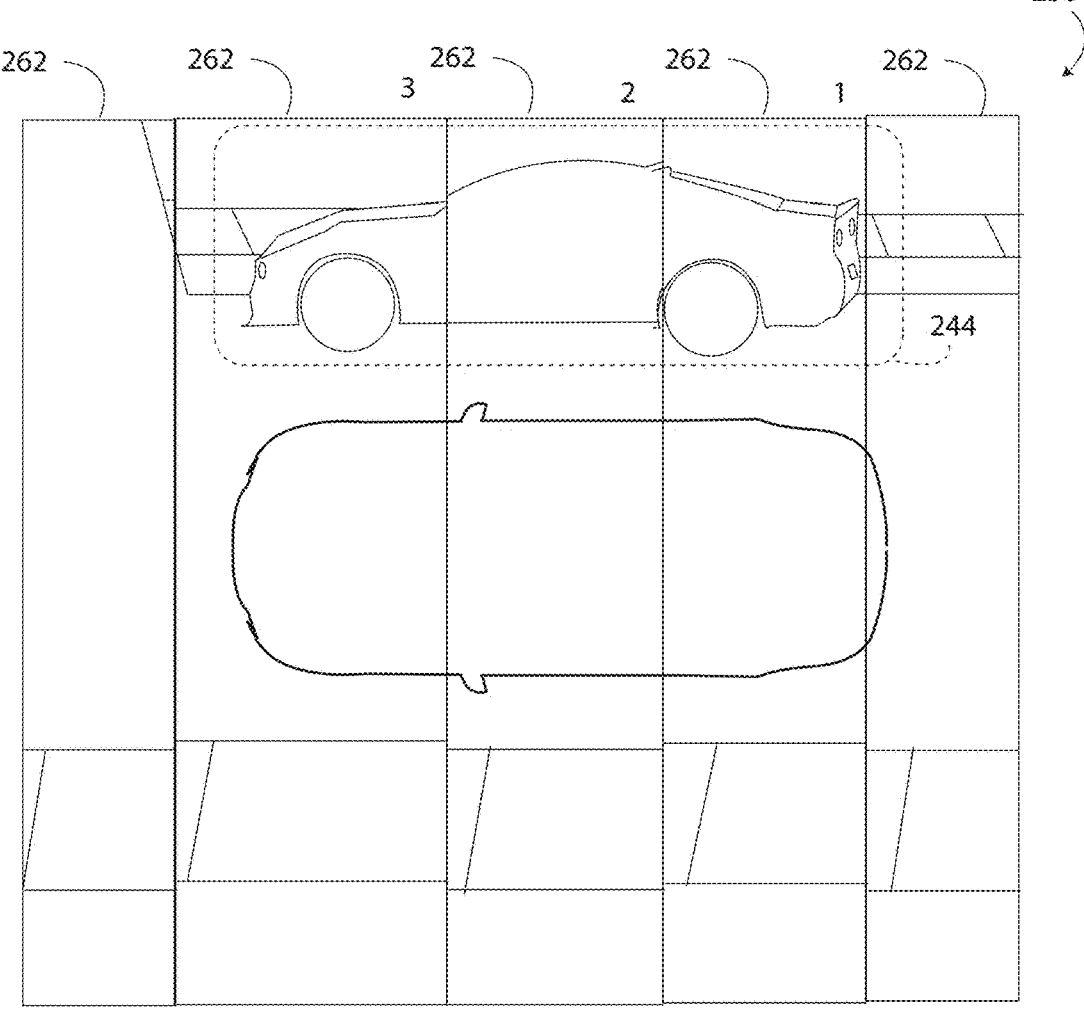
Figure 7A:
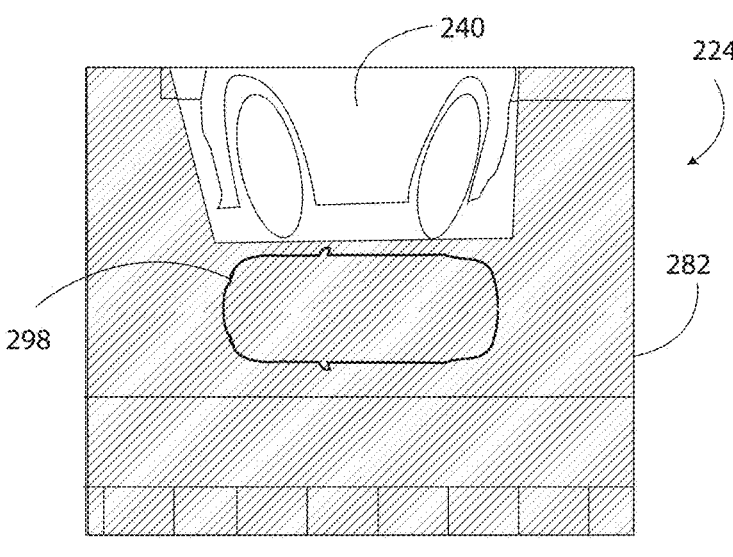
Figure 7B:
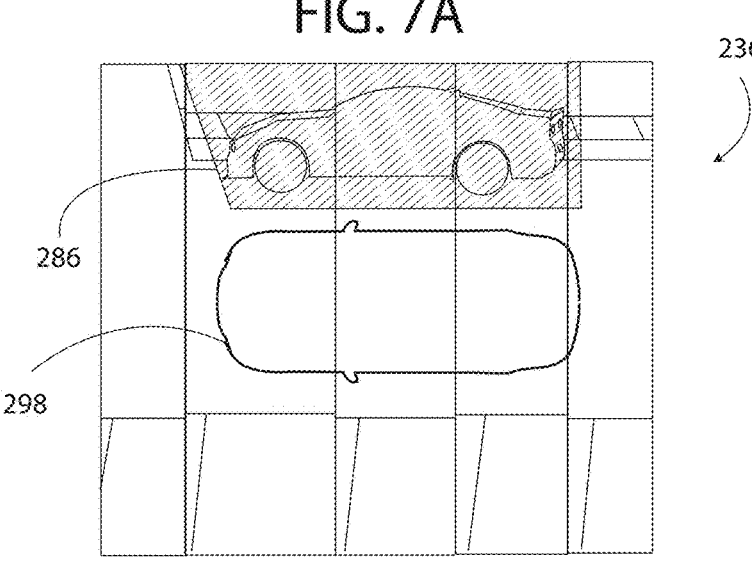
Figure 7C:
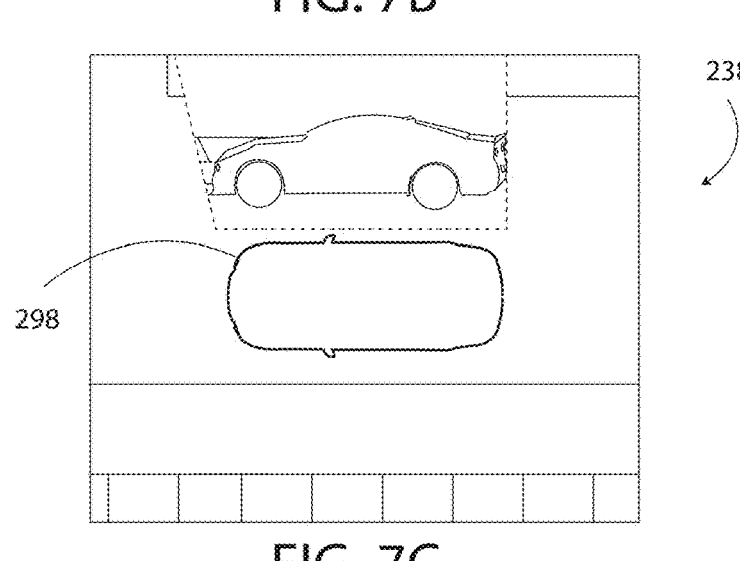

FIG. 5 is another block diagram of the traffic situation of FIG. 2 showing the vehicle in three different positions (1, 2, and 3) on the street;

FIG. 6 illustrates a historical surround view image generated by the surround view camera system of the vehicle of FIG. 1 according to a Historical View approach, the historical surround view image includes non-distorted object data representing the predetermined object of FIG. 2;

FIG. 7A illustrates the surround view image of FIG. 4 with a mask applied thereto;

FIG. 7B illustrates the historical surround view image of FIG. 6 with an inverted mask applied thereto; and FIG. 7C illustrates a composite surround view image that combines select portions of the surround view image and the historical surround view image in order to show the predetermined object of FIG. 2 without distortion.

DETAILED DESCRIPTION

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As shown in FIG. 1, a vehicle 100 includes a surround view camera system 104 having a plurality of imaging devices 108a, 108b, 108c, 108d, a memory 112, vehicle sensors 120, 124, 168, a perception sensor system 126, a display device 128, and an inertial measurement unit ("IMU") 210 each operably connected to a processor 116. The vehicle 100, which is also referred to herein as an ego vehicle, further includes a steering system 132 for steering at least two wheels 136 of the vehicle 100, as well as a motor 140 and a transmission 144 for generating and delivering a force for moving the vehicle 100 to at least one of the wheels 136.

As disclosed herein, the surround view camera system 104 generates a composite surround view image 238 (FIG. 7C) of the surrounding of the vehicle 100. The surround view camera system 104 determines when at least one predetermined object 182 (e.g., a parked vehicle 110, and/or a lamp post 114, FIG. 2) located near the ego vehicle 100 may be shown in a distorted manner in a surround view image 224 (FIG. 7A) that is generated according to a "Live View" approach from surround view image data 252. The distortion of the predetermined object 182 is referred to as the Manhattan effect and/or the skyscraper effect. For example, when the ego vehicle 100 is moved close to the parked vehicle 110, the parked vehicle 110 may appear to be much taller and larger in the surround view image 224 than it is in reality. To improve the surround view image 224, the surround view camera system 104 identifies distorted object data 240 that corresponds to the predetermined object(s) 182, and the surround view camera system 104 replaces the distorted object data 240 with non-distorted object data 244 (FIG. 6) from a historical surround view image 236 (FIG. 7B) generated from historical image data 274. The resultant composite image data 256 corresponds to the composite surround view image 238. The composite surround view image 238 typically has an improved quality and usefulness as compared to the surround view image 224 having the distortion and has dramatically reduced the Manhattan effect in the showing of the at least one predetermined object 182.

The non-distorted object data 244 of the historical surround view image 236, as shown in FIG. 6, is generated by electronically stitching together or blending multiple images 262 from at least one of the imaging devices 108a, 108b, 108c, 108d over time based on detected movement of the vehicle 100. The non-distorted object data 244 shows the predetermined objects 182 (i.e., the parked vehicle 110 and the lamp post 114) with no or less distortion than the distorted object data 240. It is in this way that the surround view camera system 104 dramatically reduces the impact of the Manhattan effect. The operator of the vehicle 100 uses the composite surround view image 238 (as shown on the display device 128) to assist in maneuvering the vehicle 100 around the predetermined objects 182, for example. Each component of the surround view camera system 104 and the vehicle 100 is described below.

The vehicle 100, in one embodiment, is a passenger vehicle that may be occupant controlled (i.e., levels zero through four autonomous control). Additionally or alternatively, the vehicle 100 is fully-autonomously controlled (i.e., level five autonomous control), and can be switched to a mode in which an operator controls the movement of the vehicle 100 from either within the vehicle cabin or from a remote location outside of the vehicle cabin. For example, the vehicle 100 is provided as a personal vehicle, a rental car, a shuttle, a limousine, a corporate vehicle, a livery vehicle, a taxi, or a robo-taxi. The vehicle 100 is inclusive of any ground-based means of carrying or transporting something or someone, including automobiles, trucks, and tractors. The vehicle 100 includes road-going vehicles, private vehicles, commercial vehicles, off-road vehicles, recreational vehicles, and agricultural vehicles.

With reference to FIG. 1, the motor 140 is an electric motor that is also referred as a traction motor. An output shaft (not shown) of the motor 140 is operably connected to the transmission 144 for transmitting torque to the transmission. In the illustrated embodiment, the motor 140 is a three-phase AC induction motor, but in other embodiments, the motor 140 is any suitable electric motor such as a brushless DC motor or a permanent magnet synchronous motor. Thus, in one embodiment, the vehicle 100 is a fully-electric vehicle. In another embodiment, the vehicle 100 also includes a combustion engine (not shown) operably connected to the transmission 144 and the electric motor 140, and the vehicle 100 is referred as a hybrid-electric vehicle. In yet another embodiment, the motor 140 includes only a combustion engine.

The transmission 144 of the vehicle 100 refers to the mechanical system for transferring torque from the motor 140 to the drive wheel(s) 136 to propel the vehicle 100 in either the forward direction or the reverse direction. In one embodiment, the transmission 144 is a one-speed transmission as is found in some electric vehicles. In other embodiments, the transmission 144 is a multi-speed automatic or manual transmission that includes multiple gears for moving the vehicle 100 in the forward direction, as is typically included with combustion engine vehicles.

The transmission 144, in one embodiment, has a park mode, a reverse mode, a neutral mode, and a drive mode, which are referred to collectively as drive states of the transmission 144. In the park mode, the transmission 144 is locked to hold the vehicle 100 in a stationary position, under most circumstances. In the reverse mode, the transmission 144 couples the motor 140 to the drive wheel(s) 136 in a manner that causes torque from the motor 140 to rotate the drive wheel(s) 136 in a direction that reverses the vehicle 100 (i.e., a reverse direction of movement). In the neutral mode, the transmission 144 decouples the motor 140 from the drive wheel(s) 136, such that the wheels 136 are free to rotate without connection to the motor 140. In the drive mode, the transmission 144 couples the motor 140 to the drive wheel(s) 136 in a manner that causes torque from the motor 140 to rotate the drive wheel(s) 136 in a direction that moves the vehicle 100 in a forward direction (i.e., a forward direction of movement).

As shown in FIG. 1, the drive state sensor 124 is operably connected to the transmission 144 for detecting the current drive state. The drive state sensor 124 generates drive state data 152 in real time, which corresponds to the presently-selected drive state of the transmission 144. The drive state data 152 indicates when the vehicle 100 is in the park mode, the reverse mode, the neutral mode, and the drive mode. The drive state data 152 is stored in the memory 112. In another embodiment, the drive state data 152 is generated by any other corresponding vehicle component and is provided to the processor 116 for storage in the memory 112.

The steering system 132, in one embodiment, is a steer-by-wire system, but may alternatively be provided as a typical mechanically operated power steering system. The steering system 132 has an operational connection to at least two of the wheels 136 (the front wheels 136 in this example) and is provided for influencing a travel direction of the vehicle 100.

The steering system 132 includes a steering angle sensor 168 that is operatively connected to the processor 116 and is configured to generate steering angle data 188 (FIG. 1) in real time. The angle sensor 168 is another vehicle sensor. The steering angle data 188 corresponds to the current steering angle of the vehicle 100. The steering angle data 188 is provided to the processor 116 and is stored in the memory 112. The angle sensor 168 is configured to sense the steering angle to generate the steering angle data 188 according to any desired approach.

With reference again to FIG. 1, the wheel speed sensor 120 is operatively connected to at least one of the vehicle wheels 136. The wheel speed sensor 120 is configured to generate wheel speed data 192 in real time. The wheel speed data 192 corresponds to a rotational speed of the monitored wheel 136 and, thus, also corresponds to a speed of the vehicle 100 in most conditions (i.e., a vehicle speed). The wheel speed sensor 120 may be connected to a non-driven wheel 136. In an exemplary embodiment, the wheel speed data 192 indicates the rotation of the monitored wheel 136 in rotations per minute (rpm), degrees per second, or any other unit of measurement. The wheel speed sensor 120, in one embodiment, is included an antilock braking system of the vehicle 100 and/or a vehicle stability control system of the vehicle 100.

The inertial measurement unit (IMU) 210 is configured to generate speed data and rotation data (i.e., IMU data 212). That is, the IMU 210 does not generate the wheel speed data 192 and the steering angle data 188, but instead generates other data based on detected movements of the vehicle 100. The IMU 210 may be included in the stability control system of the vehicle 100, for example. The IMU 210 may include a multi-axis accelerometer and a gyroscope, for example.

Each of the imaging devices 108a, 108b, 108c, 108d is a digital imaging device or digital camera configured to generate electronic image data 196 (including first image data 272 and second image data 280) representing the surroundings of the vehicle 100. For example, the imaging device 108a, 108b, 108c, 108d includes a complementary metal-oxide semiconductor (CMOS) sensor that generates the image data 196 in response to image inputs in the form of light. The imaging devices 108a, 108b, 108c, 108d are also referred to herein as a camera and/or a snapshot camera. The image data 196 generated by the imaging devices 108a, 108b, 108c, 108d corresponds to images 258 (FIG. 4) and 262 (FIG. 6) (or image portions) that are combined (e.g., stitched and/or blended) to form the surround views 224, 236, 238 of the vehicle 100. The imaging devices 108a, 108b, 108c, 108d generate the image data 196 when the vehicle 100 is stationary and when the vehicle 100 is traveling below a predetermined speed. The predetermined speed, in one example, is fifteen kilometers per hour and may range from five kilometers per hour to thirty kilometers per hour.

As shown in FIG. 2, the imaging devices 108a, 108b, 108c, 108d are mounted and/or positioned on the vehicle 100 so that fields of view 218a, 218b, 218c, 218d of the imaging devices 108a, 108b, 108c, 108d include the surroundings of the vehicle 100. FIG. 2 does not illustrate the composite surround view image 238 generated by the surround view camera system 104. Instead, FIG. 2 illustrates a block diagram of an exemplary scenario in which the vehicle 100 is operated, as viewed from above. As shown in FIG. 2, the vehicle 100 is operated on a street 184 that is flanked by sidewalks 186. Greenspace 194 is between the sidewalks 186 and the street 184. An alley 200 or other narrow access road is available to the vehicle 100 by making a right turn. However, the parked vehicle 110 is positioned very close to the alley 200, and the parked vehicle 110 is a predetermined object 182. Another predetermined object 182 is shown as a lamp post 114 at the corner of the alley 200 and the street 184.

In an embodiment, a front imaging device 108a is mounted on the front side of the vehicle 100 so that the field of view 218a includes the surroundings of the vehicle 100 encountered as the vehicle 100 moves in a forward direction. A right imaging device 108b is mounted on the right side of the vehicle 100 so that the field of view 218*b* includes the surroundings of the vehicle 100 located on the right side of the vehicle 100. A rear imaging device 108*c* is mounted on the rear side of the vehicle 100 so that the field of view 218*c* includes the surroundings of the vehicle 100 encountered as the vehicle 100 moves in a reverse direction. A left imaging device 108*d* is mounted on the left side of the vehicle 100 so that the field of view 218*d* includes the surroundings of the vehicle 100 located on the left side of the vehicle 100.

In one embodiment, the imaging devices 108*a*, 108*b*, 108*c*, 108*d* are mounted on the vehicle 100 at a camera height. The camera height is a distance between a lens of the imaging devices 108*a*, 108*b*, 108*c*, 108*d* and a ground surface on which the vehicle 100 is located. In an exemplary embodiment, the camera height is from fifty centimeters to two hundred centimeters. A specific camera height is ninety centimeters. The camera height may be the same for each imaging device 108*a*, 108*b*, 108*c*, 108*d*. Alternatively the camera height may be different for certain of the imaging devices 108*a*, 108*b*, 108*c*, 108*d*. For example, the front imaging device 108*a* may be mounted at the top of the windscreen at a first camera height, the left and right imaging devices 108*b*, 108*d* may be mounted on the side mirrors at a second camera height, and the rear imaging device 108*c* may be mounted on the deck lid at a third camera height. The first, second, and third camera heights may be different from each other.

With reference again to FIG. 1, the perception sensor system 126 is mounted on the vehicle 100 and is configured to detect a plurality of objects in the surroundings of the vehicle 100 including the predetermined objects 182 (FIG. 2). The perception sensor system 126 includes at least one of an ultrasonic sensor system 232, a light detection and ranging system ("LiDAR" or "LIDAR") 242, and a radar system (radio detection and ranging) 246. The perception sensor system 126 is operably connected to the processor 116 to provide the processor 116 with perception data 190 corresponding to the detected objects 182 in the surroundings of the vehicle 100. Moreover, in some embodiments, including the illustrated embodiment, the perception sensor system 126 includes the imaging devices 108*a*, 108*b*, 108*c*, 108*d*. As such, the imaging devices 108*a*, 108*b*, 108*c*, 108*d* are additional sensors that are configured to generate data (i.e., the image data 196) used to detect the plurality of objects in the surroundings of the vehicle 100.

The ultrasonic sensor system 232 is configured to generate perception data 190 corresponding to a distance between the vehicle 100 and the objects 182 in the surroundings of the vehicle 100. The ultrasonic sensor system 232 is also used by the vehicle 100 during parking operations of the vehicle 100, for example.

The LiDAR system 242 is configured to generate perception data 190 corresponding to a high-resolution 3D model of the surroundings of the vehicle 100 from which the LiDar system 242 detects the objects 182 and/or the processor 116 detects the objects 182. The objects 182 detected and included in the 3D model are identified by size (height, width, depth, and/or length) and type. The perception data 190 generated by the LiDAR system 242 is also referred to as a point cloud.

The radar system 246 is configured to generate perception data 190 corresponding to the position and trajectories of the objects 182 in the surroundings of the vehicle 100. For example, the radar system 246 is useful for detecting when the objects 182 in the surroundings of the vehicle 100 are moving, such as pedestrians, other vehicles, and animals. In the example of FIG. 2, the parked vehicle 110 and the lamp post 114 are stationary and are not moving. The perception data 190 from the radar system 246 includes, but is not limited to, distance, velocity, direction or bearing, and angular size of the objects 182 in the surroundings of the vehicle 100. A moving pedestrian or animal (moving predetermined objects 182) could be detected with the radar system 246.

With reference again to FIG. 1, the display device 128 is operably connected to the processor 116 and, in one embodiment, is a liquid crystal display (LCD) panel configured to display text, images, video, and other visually comprehensible data. In one embodiment, the display device 128 is positioned in a center stack of the cabin of the vehicle 100 and may be shared with other functions of the vehicle 100, such as the stereo system and climate controls. The display device 128 is configured to display the composite surround view image 238 (FIG. 7C) and the surround view image 224 (FIG. 7A) generated by the surround view camera system 104 in real time. Specifically, the display device 128 is configured to display the most currently-generated composite surround view image 238 or the most currently-generated surround view image 224, so that the display device 128 displays a bird's eye video of the current surroundings of the vehicle 100, as the vehicle 100 is moved and as the vehicle 100 is stationary. In some embodiments, the display device 128 may also be configured to display the historical surround view image 236 (FIG. 7B).

The display device 128 may include a touch screen or other input device for receiving user inputs, such a user input for activating the surround view camera system 104. The display device 128, in another embodiment, is any display as desired by those of ordinary skill in the art, including, but not limited to, an active-matrix organic light-emitting diode display. In an example, the display device 128 is the display screen of a smartphone (not shown) operably connected to the vehicle 100. The display device 128 may also be the display screen of a remote computer system (not shown) that is spaced apart from the vehicle 100 and electronically connected to the vehicle 100 through a wireless computer network and/or a cellular network. In such an embodiment, the vehicle 100 includes a transceiver for electronically communicating with the network.

As shown in FIG. 1, the memory 112 is an electronic storage device that is configured to store at least the perception data 190, the image data 196, vehicle data 202, and change data 206. The memory 112 is also referred to herein as a non-transient computer readable storage medium.

The processor 116 (FIG. 1) is a structural device configured to execute program instructions in order to operate the surround view camera system 104 for generating the surround view image 224, the historical surround view image 236, and the composite surround view image 238. The processor 116 is provided as at least one microcontroller and/or microprocessor. The processor 116 may also be implemented with a general purpose processor, a digital signal processor (DSP), an application specific integrated circuit (ASIC), a field programmable gate array (FPGA), a graphics processing unit (GPA), an image signal processor (ISP) or other programmable logic device, discrete gate or transistor logic, discrete hardware components, or any combination thereof designed to perform the functions described herein. A general-purpose processor may be a microprocessor, but in the alternative, the processor 116 may be any conventional processor, controller, microcontroller, or state machine. The processor 116 may also be implemented as a combination of computing devices, e.g., a combination of a DSP and a microprocessor, a plurality of microprocessors, one or more microprocessors in conjunction with a DSP core, or any other such configuration. In one embodiment, the processor 116 is provided as the electronic control unit (ECU) (not shown) of the vehicle 100, such that the ECU is used to generate the surround view image 224, the historical surround view image 236, and the composite surround view image 238.

In FIG. 1, the processor 116 is connected directly to several of the vehicle components. In another embodiment the processor 116 and the vehicle components are each operatively connected to a bus system (not shown) for the transfer of the data used to operate the vehicle 100 including the surround view camera system 104. An exemplary bus system is the controller area network bus (CAN bus). The bus system is alternatively provided as an Ethernet based system and/or any other vehicle bus.

The processor 116 is configured to generate and/or receive data that is used to generate the surround view images 224, 236, 238. For example, the processor 116 generates distance data 208 based on the wheel speed data 120, the perception data 190, and/or the IMU data 212. The distance data 208 corresponds to how far the vehicle 100 has moved on the ground. The distance data 208 is determined similarly or the same as odometry data of the vehicle 100 is determined. Odometry data is shown in an odometer portion of the vehicle 100 dashboard, for example. In some embodiments, however, the distance data 208 is more accurately determined than the odometry data. For example, by using the wheel speed data 192 and a known diameter of the wheel (and tire), the processor 116 can determine distance data 208 accurate to within a centimeter or less. The distance data 208 may additionally or alternatively be determined using the ultrasonic sensor system 232, the LiDAR 242, and/or the radar 246.

The processor 116 is also configured to generate yaw data 214 based on the steering angle data 188, the perception data 190, and/or the IMU data 212. The yaw data 214 corresponds to a rotational position of the vehicle 100 about a yaw axis. The yaw axis extends vertically through the vehicle 100. The yaw data 214 is stored in the memory 112. The yaw position is the rotational position about the yaw axis of the vehicle 100.

The processor 116 is further configured to generate change data 206 based on the vehicle data 202 generated by the vehicle sensors 120, 124, 168, the perception sensor system 126, and the IMU 210. The change data 206, in one example, corresponds to a change in position of the vehicle 100 at each position that one of the images 258, 262 is generated by the imaging device 108. The change data 206 may include position data 216 that corresponds to the position of the vehicle 100 on a selected coordinate system (such as an X-Y coordinate system) when the images 258, 262 are taken. The change data 206 is stored in the memory 112. For example, the change data 206 includes the distance data 208 and the yaw data 214 so that the processor 116 can determine the position data 216 corresponding to how far and with what yaw angle the vehicle 100 has moved from each position at which an image 258, 262 is generated. Any other data to determine an accurate position of the vehicle 100 may also be included in the change data 206 generated by the processor 116, such as compass heading data of the vehicle 100, as may be provided by an electronic compass sensor of the vehicle 100 (i.e., another vehicle sensor).

Figure 3:
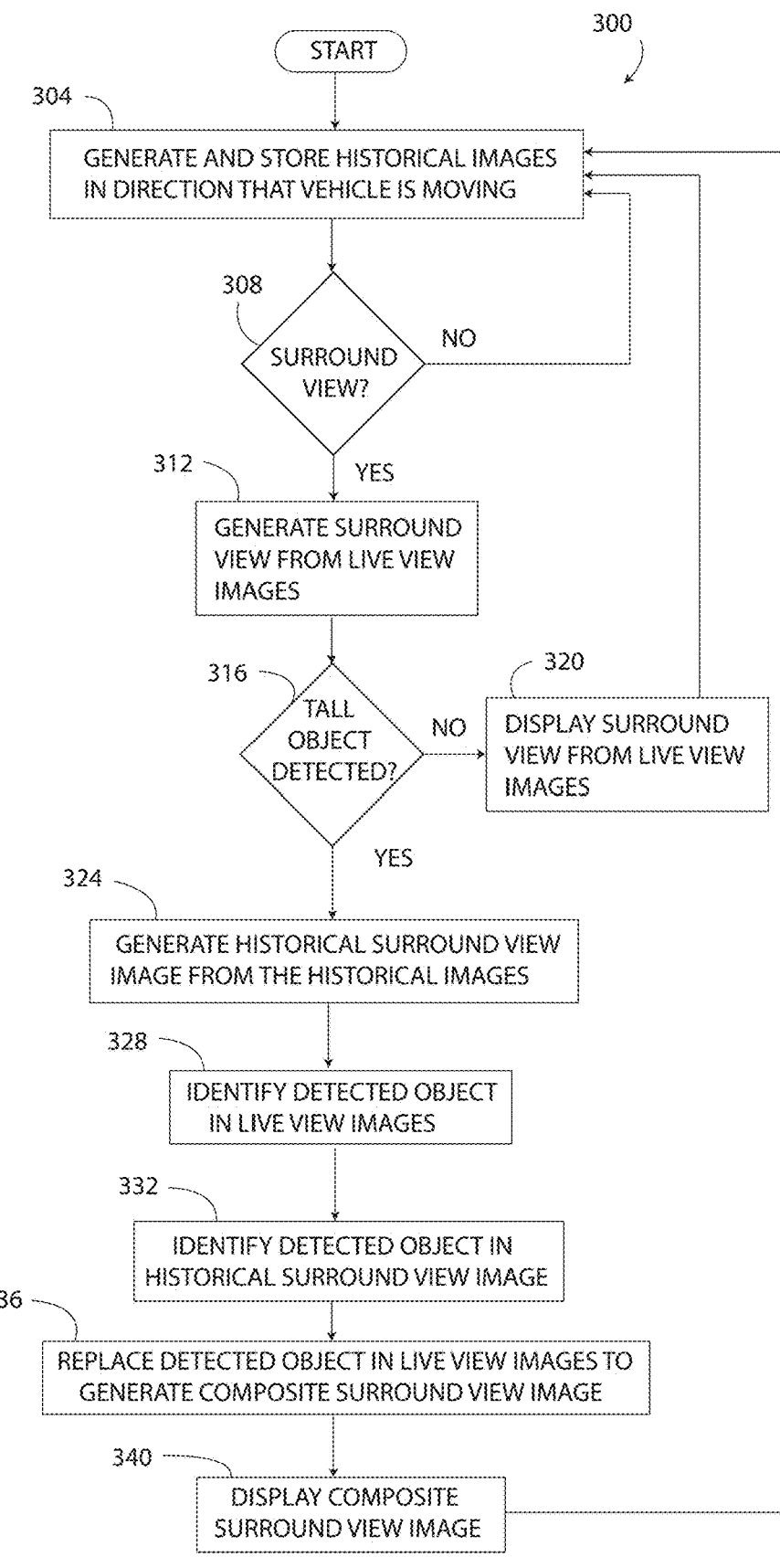
FIG. 3 is a flowchart illustrating an exemplary method of operating the surround view camera system of FIG. 1.

In operation, and with reference to the flowchart of FIG. 3, the surround view camera system 104 is configured to implement a method 300 of generating a continuously-updated composite surround view image 238 (FIG. 7C)

representing the surroundings of the vehicle 100 and showing the predetermined objects 182 in the surroundings of the vehicle 100 with less or with no distortion. The method 300 greatly reduces the Manhattan effect that is sometimes observed in the surround view image 234 (FIGS. 4 and 7A) by replacing any distorted object data 240 with the non-distorted object data 244.

The method 300 operates by simultaneously performing two surround view generation techniques. The first surround view generation technique is termed the "Live View" approach, and the second surround view generation technique is termed the "Historical View" approach. According to the Live View approach, four real-time images 258 (FIG. 4) from the imaging devices 108a, 108b, 108c, 108d are stitched or blended together to form the surround view image 224. Thus, the surround view image 224 shows a live view of the surroundings of the vehicle 100 including motion and movement of predetermined objects 182 in the surroundings of the vehicle 100. According to the Historical View approach, portions of past or "historical" images 262 (FIG. 6) (i.e., from a few seconds ago or a few minutes ago) from at least one the imaging devices 108a, 108b, 108c, 108d are combined using the vehicle data 202, the change data 206, and the perception data 190 to form the historical surround view 236 (FIG. 6, also referred to as a history image) of the surroundings of the vehicle 100. In the Historical View approach, due to the position of the imaging devices 108a, 108b, 108c, 108d relative to the objects 182 in the surroundings, at least portions of the resultant images 262 show the predetermined objects 182 with little, less, or no distortion. The historical surround view 236 shows the surroundings of the vehicle 100 without motion or movement of the predetermined objects 182 or any other objects. The historical surround view 236; thus, is not a live view of the surroundings of the vehicle 100. The processor 116 combines portions of the images 262 to form the historical surround view 236. The method 300 removes distorted object data 240 from the surround view image 224 generated using the Live View approach and selectively replaces the removed data 240 with the non-distorted object data 244 from the Historical View approach. The full process is described below with reference to FIG. 3.

At block 304 of the method 300 and with reference to FIGS. 5 and 6, the processor 116 generates the images 262 that are used to form the historical surround view 236. The images 262 used in the Historical View approach are generated even when a call for the surround view camera system 104 has not been made by the operator of the vehicle 100. This is because the Historical View approach relies on historical images 262. As result, in one embodiment whenever the vehicle 100 is moving below the predetermined speed, the method 300 includes at least generating the images 262 of the Historical View approach so that distortion can be corrected in the surround view image 224, if required. The images 262 are saved to the memory 112 as the first image data 272 and, in one embodiment, have a corresponding time stamp indicating a time when the first image data 272 was generated.

In FIG. 5, the processor 116 uses the vehicle data 202, such as the drive state data 152, the perception data 190, and/or the IMU data 212 to determine if the vehicle 100 is moving in the forward direction or the reverse direction. When the processor 116 determines that the vehicle 100 is moving in the forward direction, the processor 116 activates at least the front imaging device 108a to generate the first image data 272 of the Historical View approach. Likewise, when the processor 116 determines that the vehicle 100 is moving in the reverse direction, the processor 116 activates at least the rear imaging device 108*c* to generate the first image data 272 of the Historical View approach. Thus, the first image data 272 of the Historical View approach is generated using at least the imaging device 108*a*, 108*c* that is facing the direction of movement of the vehicle 100. The left side imaging device 108*b* and the right side imaging device 108*c* are used in the generation of the first image data 272 when the vehicle is turning as is determined from the steering angle data 188. For example, when the vehicle is moving forward and turning to the left, at least the front imaging device 108*a* and the left side imaging device 108*d* used simultaneously to generate the first image data 272 of the Historical View approach. Likewise, when reversing while turning the rear imaging device 108*c* and at least one of the side imaging devices 108*b*, 108*d* are operated simultaneously to generate the first image data 272 of the Historical View approach. As a result, a comprehensive historical surround view 236 is formed that includes images 262 of all of the predetermined objects 182 in the surroundings of the vehicle 100.

Also at block 304, at each of the positions 1, 2, and 3 (see FIGS. 2, 5, and 6) that the imaging device 108*a*, 108*c* generates an image 262, the processor 116 associates corresponding change data 206 with the images 262. The change data 206, as noted, indicates the change in position of the vehicle 100 from each position that an image 262 is generated. As explained below, the change data 206 is used to blend, stitch, and/or combine portions of the images 262 to form the historical surround view 236, when the processor 116 determines that the historical surround view 236 is required.

Next, at block 308 the processor 116 determines if the operator of the vehicle 100 has made a request to show the surround view image 224 on the display device 128 or if the surround view image 224 is required for any other reason. If no request for the surround view image 224 has been made, then the method 300 continues to generate the first image data 272 of the Historical View approach at block 304. If a request for the surround view image 224 has been made, then the method 300 proceeds to block 312.

At block 312 and with reference to FIG. 4, the processor 116 generates the surround view image 224 according to the Live View approach. The surround view image 224 is a combination of four images 258 as generated by each of the imaging devices 108*a*, 108*b*, 108*c*, 108*d* from the second image data 280. The images 258 are saved to the memory 112 as the second image data 280 along with, in one embodiment, a corresponding time stamp indicating a time when the second image data 280 was generated. As noted, the second image data 280 is typically generated after the generation of the first image data 272. The dashed lines 284 approximate the locations of the joints of the stitched images 258. As shown in FIG. 4, the surround view image 224 includes distorted object data 240 corresponding to the parked vehicle 110. At block 312, the surround view data 252 of the surround view image 258 is generated but is not shown on the display device 128 of the vehicle 100 until additional processing is performed.

In the example of FIG. 4, the portion of the second image data 280 that includes the distorted object data 240 is generated by the right side imaging device 108*b*. Typically, the portion of the surround view image 224 containing the distorted object data 240 is generated by either the left side imaging device 108*d* or the right side image device 108*b*.

With reference to block 316 of the method 300 of FIG. 3, the processor 116 determines when there are any "tall"

predetermined objects 182 in the surroundings of the vehicle 100. First, to detect or to identify the predetermined objects 182, the processor 116 utilizes the perception data 190 from the perception sensor system 126. The perception sensor system 126 is configured to detect the plurality of objects 182 in the surroundings of the vehicle 100 using at least one of the ultrasonic sensor system 232, the LiDAR system 242, the radar system 246, and imaging devices 108*a*, 108*b*, 108*c*, 108*d*. For example, in FIG. 2 the parked vehicle 110 and the lamp post 114 are detected as being predetermined objects 182 using any one or more of the ultrasonic sensor system 232, the LiDAR system 242, the radar system 246, and imaging devices 108*a*, 108*b*, 108*c*, 108*d*. Any other object in the surroundings of the vehicle 100 is also detected.

Next at block 316, the method 300 includes determining if any of the detected predetermined objects 182 are likely to result in distorted object data 240 in the surround view image 224. An exemplary approach for determining when an object 182 is likely to result in distortion is based on the height of the object 182 as identified by the processor 116 using the perception sensor system 126. According to this approach, the processor 116 compares a maximum detected height of each of the predetermined objects 182 to the camera height. Objects 182 taller than the camera height are likely to result in image distortion of the surround view image 224 based on the positioning of the image devices 108*a*, 108*b*, 108*c*, 108*d* and the construction of the lenses of the imaging devices 108*a*, 108*b*, 108*c*, 108*d*. When the predetermined object 182 has a maximum detected height that exceeds the camera height, then the predetermined object 182 is likely to result in image distortion. However, when the predetermined object 182 has a maximum detected height that is less than the camera height image distortion in the surround view image 224 is unlikely or less likely to occur.

The processor 116 uses the maximum detected height of the objects 182 to determine the distortion causing objects 182. For example, the perception sensor system 126 may not be able to detect the actual height of the lamp post 114 that is ten meters high. However, the perception sensor system 126 can detect that the lamp post 114 is at least three meters high based on an available detection range of the systems 232, 242, 246. In such a situation, the maximum detected height of the lamp post 114 is processed as three meters.

At block 316 when each of the detected objects 182 have a maximum detected height that is less than the predetermined height (i.e., no "tall" objects) as determined from the perception data 190, then at block 320, the processor 116 displays the surround view image 224 that was generated at block 312 according to the Live View approach. However, if at least one of the objects 182 detected has a maximum detected height that is greater than the predetermined height as determined from the perception data 190, then at block 324, the processor 116 proceeds with the Historical View approach to generate the required non-distorted object data 244 for correcting the distortion resulting from the detected tall predetermined object 182 in the surround view image 224.

At block 324 and with reference again to FIGS. 5 and 6, the processor 116 generates the historical image data 274 that results in the historical surround view image 236. As shown in FIG. 5, three positions of the vehicle 100 are identified as positions 1, 2, and 3. The "position" identifies the location of the front most portion of the ego vehicle 100. The positions are also identified in FIG. 2, but the vehicle 100 is illustrated in only position 3 in FIG. 2. In this example, when the surround view image data 252 is generated, the vehicle 100 is at position 3. Previously in time, the vehicle 100 was at position 2, and prior to that the vehicle 100 was at position 1. Thus, in generating the surround view image 224, the second image data 280 is used that was generated at a second time. Whereas, the first image data 272 used to generate the historical surround view image 236 was generated at least at positions 1 and 2 during a first time. The second time is different from the first time and is after the first time, as such, the first image data 272 is referred to as being "historical," but was generated only a very short time earlier (a few seconds to a few minutes at most).

FIG. 5 shows the field of view 218*a* of the front imaging device 108*a* at each of the three positions. The shaded portions of the fields of view 218*a* represent the approximate portions of the images 262 that are used in the combination historical surround view image 236. As shown, the parked vehicle 110 is well in front of the imaging device 108*a* when the image 262 is generated at position 1. This is in comparison to the position of the right side imaging device 108*b*, which is very close the parked vehicle 110 when the ego vehicle 100 is at position 3. The greater distance between the front imaging device 108*a* and the parked vehicle 110 causes the resultant image 262 to show the parked vehicle 110 with less distortion than the image 258 of the parked vehicle 110 taken at position 3 by the left side imaging device 108*b*.

The processor 116 forms the historical surround view 236 of FIG. 6 by piecing together select or predetermined portions of the images 262. Specifically, the processor 116 uses the vehicle data 202 and/or the change data 206 to determine how far and in which direction the vehicle 100 has moved between the positions 1, 2, 3. For example, in moving from position 1 to position 2, the vehicle 100 advanced about one meter and there was no significant change in yaw. Thus, in stitching together the images 262 from positions 1 and 2, the processor 116 uses the corresponding distance data 208 and position data 216 to combine the images 262 in a manner that the objects 182 and other structures shown in the images 262 are continuous across the combined image 236 and are the same relative size in the combined image 236. This process is repeated using the available first image data 272 generated in block 304. The concept in FIG. 6 and block 324 is that by combining the images 262 based on the change data 206 and the vehicle data 202, at least portions of the images 262 are combinable to result in a single larger image showing the surroundings of the vehicle 100. The single larger image is the historical surround view image 236 of FIG. 6, as represented by the historical image data 274. A similar process is sometimes used to form a panoramic image from several smaller images, for example. The effect of the historical surround view image 236 is to provide an apparent top-down view of the surroundings of the vehicle 100 from the images 262 generated by the imaging devices 108*a*, 108*b*, 108*c*, 108*d*.

Next, at block 328 and with reference to FIG. 7A, the method 300 includes identifying the detected object 182 that is shown with distortion in the surround view image 224 generated according to the Live View approach. Stated differently, at block 328 the processor 116 is configured to identify the distorted object data 240 in the second image data 280 of the surround view image 224 that corresponds to the predetermined object 182. The location of the distorted object data 240 is identifiable in the surround view image 224, because the location of the predetermined object 182 relative to the vehicle 100 is known from the perception data 190 that was used to detect the predetermined object 182. The processor 116 maps the determined location of the predetermined object 182 to the corresponding location in the surround view image 224. Then, according to one approach, a mask 282 (FIG. 7A) is formed that corresponds to the area of the distorted object data 240 in the second image data 280 of the surround view image 224. The exemplary mask 282 covers the entire surround view image 224 except for the distorted representation of the parked vehicle 110. That is, the mask 282 covers the portion of the surround view image 224 that is to be retained in the composite surround view image 238.

At block 332 and with reference to FIG. 7B, the method 300 also includes identifying the detected object 182 in the combined image of the historical surround view image 236. Stated differently, at block 332 the processor 116 is configured to identify the non-distorted object data 244 corresponding to the predetermined object 182 in the first image data 272 of the historical surround view image 236. In the historical surround view image 236, the predetermined object 182 is shown without distortion or with much less distortion. The location of the non-distorted object data 244 is identifiable in the historical surround view image 236, because the location of the predetermined object 182 relative to the vehicle 100 is known from the perception data 190 that was used to detect the predetermined object 182. The processor 116 maps the determined location of the predetermined object 182 to the corresponding location in the historical surround view image 236. Then, according to one approach, the mask 282 is inverted to form an inverted mask 286. The inverted mask 286 is applied to the historical image data 274 to identify the non-distorted object data 244 that should be included in the surround view image 224. That is, the inverted mask 286 covers only the non-distorted representation of the parked vehicle 110 as shown in the historical surround view image 236. The inverted mask 286 covers the portion of the historical surround view image 236 that is to be retained in the composite surround view image 238.

Next, at block 336 and with reference to FIG. 7C, the processor 116 is configured to replace the distorted object data 240 of the predetermined object 182 in the second image data 280 of the surround view image 224 with the non-distorted object data 244 of the predetermined object 182 in the first image data 272 of the historical surround view image 236. This approach forms the composite image data 256 that represents the composite surround view image 238. The composite surround view image 238 more accurately shows the surroundings of the vehicle 100 as compared to the surround view image 224. For example, in some situations, the surround view image 224 may show the predetermined object 182 with so much distortion that the operator of the vehicle 100 cannot determine what is being represented. The composite surround view image 238 attempts to show the predetermined object 182 in a more natural representation so that the operator of the vehicle 100 can identify what type of object is nearby and operate the vehicle accordingly. The composite surround view image 238 improves the surround view image 224 by dramatically reducing the Manhattan effect in the showing of the predetermined objects 182. In use, the surround view camera system 104 replaces the distorted object data 240 of all of the detected tall predetermined objects 182 in the surroundings of the vehicle 100. The detected tall predetermined objects 182 may be located on the left and right sides of the vehicle 100.

At block 336 according to an exemplary approach, the processor 116 uses the mask 282 and the inverted mask 286 to generate the composite image data 256. Specifically, with reference to FIG. 7B, the processor 116 forms first masked image data (i.e. the non-distorted object data 244) by applying the inverted mask 286 to the first image data 272 according to a logical AND operation to isolate the non-distorted object data 244 from the historical surround view image 236. Next, the processor 116 forms second masked image data (i.e. the portion of the surround view image 224 that is not distorted) by applying the mask 282 to the second image data 280 according to a logical AND operation to remove the distorted object data 240 from the surround view image 224. Then, the processor 116 combines the first masked image data and the second masked image data according to an AND operation to generate the composite surround view image data 238. Other approaches are also available for forming the composite surround view image 238, which replaces the distorted object data 240 with the non-distorted object data 244.

Next at block 340, the composite surround view image 238 is shown on the display device 128, by transmitting the composite image data 256 to the display device 128. An icon 298 depicting the vehicle 100 is also shown on the display device 128 so that the operator has an understanding of the location of the vehicle 100 in the composite surround view image 238. An operator of the vehicle 100 views the composite surround view image 238 and then operates the vehicle 100 to maneuver the vehicle 100 around the obstacles 182 so as to avoid the obstacles 182.

In one embodiment, before performing the method 300, the surround view camera system 104 is calibrated. Calibrating the surround view camera system 104 includes making adjustments so that the images 258 generated by the imaging devices 108a, 108b, 108c, 108d are stitched and/or blended together correctly. Correctly stitching and/or blending together the images 258 includes combining the images 258 so that the features of the images 258 are shown in alignment and at the same scale in the surround view image 224, for example.

The method 300, in one embodiment, is performed with the vehicle 100 in a rigid-body configuration. In the rigid-body configuration all of the doors of the vehicle 100 are closed and the trunk or rear hatch is closed. Thus, in the rigid body configuration all of the imaging devices 108a, 108b, 108c, 108d (which may be mounted on the doors, the trunk, and/or the rear hatch) are in a known and predetermined position relative to each other.

Moreover, during the method 300, at blocks 312 and 324 additional image processing may also be performed including dewarping the images 258, 262, when appropriate. Dewarping refers to reducing and/or eliminating distortion of an image caused by structural characteristics of the lens of the imaging device 108a, 108b, 108c, 108d. Typically, dewarping is utilized when the imaging device 108a, 108b, 108c, 108d includes a fisheye lens, and is also referred to as fisheye dewarping. The processor 116 is configured to process the image data 196 to perform the dewarping. The method 300 includes performing the dewarping, if required, prior to forming the image data 252, 256, 274.

As a further approach for operating the surround view camera system 104, the processor 116 is configured to continually update the second image data 280 of the Live View approach, such that the composite surround view image 238 includes (i) a real time view of the surroundings of the vehicle 100 based on the updated second image data 280, and (ii) a static past time view of the predetermined object 182 based on the first image data 272. For example, with reference to FIG. 2, according to this approach, the operator stops the vehicle 100 at position 3 and views the display device 128 for a few moments. During this time when the vehicle 100 is stationary, the composite surround view image 238 illustrates the parked vehicle 110 with the non-distorted object data 244 of the first image data 272 used to form the historical surround view image 236. However, the portion of the second image data 280 that is not distorted (i.e., the masked region of FIG. 7A) is updated in real time to show the real time surroundings of the vehicle 100. Thus, the showing of the parked vehicle 110 is static in the composite surround view image 238, but each other portion of the composite surround view image 238 is a real time view that is continuously updated.

Likewise, another approach for operating the surround view camera system 104 includes operating the vehicle 100 in a forward direction or a reverse direction and continuing to generate the composite surround view image data 256. This approach is also described with reference to FIG. 2. For example, the ego vehicle 100 is moving slowly and the surround view camera system 104 has been activated, manually or automatically, to generate and to display the composite surround view image 238. As the ego vehicle 100 approaches and moves the past the parked vehicle 110, the position of the parked vehicle 110 in the composite surround view image 238 is updated based on the current position of the ego vehicle 100; however, the parked vehicle 110 is still shown as a static past time view. That is, as the ego vehicle 100 moves in a forward direction, the showing of the parked vehicle 110 in the composite surround view image 238 moves to the right to show that the operator is driving past the obstacle 182. This assists the operator in making the tight right hand turn into the alley 200. A corresponding approach is taken when the vehicle 100 is operated in the reverse direction.

Another approach for operating the surround view camera system 104 includes updating the composite surround view image 238 when it is detected that a predetermined object 182 in the surroundings of the vehicle 100 is moving relative to the vehicle 100 or to a ground surface on which the vehicle 100 is located. For example, the perception sensor system 126 is configured to generate the perception data 190 that indicates when a detected object 182 is moving relative to the ego vehicle 100 or to the ground. Accordingly, the processor 116 is able to group the detected objects 182 into two classes including moving objects and stationary objects. The stationary objects of the plurality of objects 182 are stationary relative to the ground surface. The moving objects of the plurality of objects 182 are moving relative to the ground surface. The lamp post 114 and the parked vehicle 110 of FIG. 2 are exemplary stationary objects. There are at least two approaches available when the detected objects 182 are classified by their relative movement.

As a first approach, when a detected moving object 182 is present, the processor 116 is configured to show the surround view image 224 on the display device 128 instead of generating the composite surround view 238 and instead of replacing any distorted object data 240 caused by tall predetermined objects 182. In such an embodiment, in the example of FIG. 2, the surround view image data 252 corresponds to a surround view of the surroundings of the vehicle 100 including a live view of the moving predetermined object 182 and, for example, the distorted view of the parked vehicle 110. In this embodiment, the surround view image data 252 is based on only the second image data 280 without replacing the distorted object data 240. Exemplary, moving objects 182 detected by the processor 116 and/or the perception sensor system 126 include adult pedestrians, children pedestrians, cyclists, animals, rolling objects, and objects blowing in the wind. This approach sacrifices the additional clarity provided by the non-distorted object data 244 included in the composite surround view image 238, for showing the potentially more important position of the moving object 182 detected by the perception sensor system 126.

As a second approach, when at least one detected moving object 182 and at least one detected stationary object 182 are both present, the processor 116 is configured to generate the composite surround view image data 256 by replacing the distorted object data 240 with the non-distorted object data 244 for only the stationary objects 182 of the plurality of objects 182. In this approach, the distorted object data 240, if any, associated with the at least one moving detected object 182 is not replaced and is included in the composite surround view image 238. For example, the surroundings of the vehicle 100 may include a parked vehicle 110 located on the left side of the ego vehicle 100 and a moving vehicle 182 located on the right side of the ego vehicle 100. The distorted object data 240 associated with the parked vehicle 110 is replaced with the corresponding non-distorted object data 244 from the Historical View approach, whereas the composite surround view image 238 shows the distorted object data 240 from the Live View approach of the moving vehicle 182 so that the operator of the vehicle 100 is able to see the representation of the moving vehicle 182 in the composite surround view image 238. In this approach, the processor 116 generates the composite surround view image data 256 by replacing the distorted object data 240 with the non-distorted object data 244 only when the distorted object data 240 corresponds to an identified stationary object 182 of the plurality of objects 182.

In another embodiment of the surround view camera system 104, the processor 116 is configured to overlay virtual data on top of the distorted object data 240 of the surround view image 224 instead of replacing the distorted object data 240 with the non-distorted object data 244. According to this approach when a distortion causing predetermined object 182 is detected in the surround view image 224, the processor 116 identifies the type of object 182 and the position of the object 182 using the perception data 190. In the example of FIG. 2, the parked vehicle 110 is identified as being a "vehicle" type of object 182 and the position of the parked vehicle 110 relative to the ego-vehicle 100 is determined. Thereafter, the processor 116 overlays a corresponding graphic upon the distorted object data 240 of the surround view image 224 that includes a representation of the detected type of object in a non-distorted configuration. In FIG. 2, a generic graphic of a top view of a passenger vehicle is overlaid on the distorted object 240 in the position of the parked vehicle 110. The graphic representing the parked vehicle 110 is not an image of the actual parked vehicle 110, but instead is a non-distorted icon or model of a vehicle that shown in the same size and position as the parked vehicle 110 from a top view. The surround view image 224 and the graphic overlay are shown and continuously updated on the display device 128 when a call for the surround view is made by the operator of the vehicle 100. The overlay approach solves the problem of the Manhattan effect with a savings of computational resources as compared to the deconstruction approach that replaces the distorted object data 240 with the non-distorted object data 244.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of operating a surround view camera system for a vehicle, the method comprising:

generating first image data at a first time using a first imaging device operably connected to the vehicle;

generating second image data at a second time using a second imaging device operably connected to the vehicle, the second time different from the first time, and the second imaging device different from the first imaging device;

identifying distorted object data in the second image data using a processor configured to receive the first image data and the second image data, the distorted object data corresponding to a predetermined object in surroundings of the vehicle;

identifying non-distorted object data in the first image data using the processor, the non-distorted object data corresponding to the predetermined object;

generating composite surround view image data using the processor by replacing the distorted object data with the non-distorted object data, the composite surround view image data corresponding to a composite surround view image of the surroundings of the vehicle; and operating the vehicle to avoid the predetermined object based on the composite surround view image data.

2. The method as claimed in claim 1, further comprising:

detecting a plurality of objects, including the predetermined object, in the surroundings of the vehicle with a perception sensor system, wherein the perception sensor system includes at least one of an ultrasonic sensor system, a radar system, and a LIDAR system, and wherein the perception sensor system generates perception data corresponding to the detected plurality of objects.

3. The method as claimed in claim 2, further comprising:

identifying the predetermined object as exceeding a predetermined height based on the perception data using the processor and/or the perception sensor system, wherein the second imaging device is mounted on the vehicle at a camera height, and wherein the predetermined height is greater than the camera height.

4. The method as claimed in claim 2, further comprising:

detecting that the predetermined object is moving relative to a ground surface based on the perception data using the processor and/or the perception sensor system;

generating surround view image data based on only the second image data without replacing the distorted object data when the predetermined object is detected as moving, the surround view image data corresponding to a surround view image of the surroundings of the vehicle including a live view of the moving predetermined object; and operating the vehicle to avoid the predetermined object based on the surround view image data.

5. The method as claimed in claim 2, further comprising:

identifying stationary objects of the plurality of objects that are stationary relative to a ground surface based on the perception data using the processor and/or the perception sensor system;

identifying moving objects of the plurality of objects that are moving relative to the ground surface based on the perception data using the processor and/or the perception sensor system; and generating the composite surround view image data by replacing the distorted object data with the non-distorted object data only when the distorted object data corresponds to an identified stationary object of the plurality of objects.

6. The method as claimed in claim 1, further comprising:
continually updating the second image data, such that the composite surround view image includes (i) a real time view of the surroundings of the vehicle based on the second image data, and (ii) a static past time view of the predetermined object based on the first image data.

7. The method as claimed in claim 1, wherein generating the composite surround view image data comprises:
forming a mask that corresponds to an area of the distorted object data in a surround view image formed from the second image data, the surround view image corresponding to a surround view of the surroundings of the vehicle;
inverting the mask to form an inverted mask;
forming first masked image data by applying the inverted mask to a historical surround view image formed from the first image data according to an AND operation to isolate the non-distorted object data, the historical surround view image corresponding to a surround view of the surroundings of the vehicle;
forming second masked image data by applying the mask to the surround view image according to an AND operation to remove the distorted image object data; and
combining the first masked image data and the second masked image data according to an AND operation to generate the composite surround view image data.

8. The method as claimed in claim 1, wherein:
the first image data is generated by the first imaging device mounted on a front side of the vehicle or mounted on a rear side of the vehicle; and
the second image data is generated by the second imaging device mounted on a left side of the vehicle or on a right side of the vehicle.

9. The method as claimed in claim 8, further comprising:
operating the vehicle in a forward direction or a reverse direction and continuing to generate the composite surround view image data.

10. A surround view camera system for a vehicle, comprising:
a first imaging device mounted on the vehicle and configured to generate first image data at a first time of surroundings of the vehicle;
a second imaging device mounted on the vehicle and configured to generating second image data of the surroundings of the vehicle at a second time different from the first time;
a perception sensor system configured to detect a plurality of objects in the surroundings of the vehicle;
a processor operably connected to the first imaging device, the second imaging device, and the perception sensor system, the processor configured to:
receive the first image data and the second image data;
identify a predetermined object of the plurality of objects detected by the perception sensor system;
identify distorted object data in the second image data, the distorted object data corresponding to the predetermined object;
identify non-distorted object data in the first image data, the non-distorted object data corresponding to the predetermined object; and
generate composite surround view image data by replacing the distorted object data with the non-distorted object data, the composite surround view image data corresponding to a composite surround view image of the surroundings of the vehicle, wherein the vehicle is operated to avoid the predetermined object based on the composite surround view image data.

11. The surround view camera system as claimed in claim 10, further comprising:
a display device operably connected to the processor and configured to receive the composite surround view image data and to display the composite surround view image.

12. The surround view camera system as claimed in claim 10, wherein:
the perception sensor system includes at least one of an ultrasonic sensor system, a radar system, and a LIDAR system, and
wherein the perception sensor system generates perception data corresponding to the detected plurality of objects.

13. The surround view camera system as claimed in claim 12, wherein the processor is further configured to:
identify the predetermined object as exceeding a predetermined height based on the perception data,
wherein the second imaging device is mounted on the vehicle at a camera height, and
wherein the predetermined height is greater than the camera height.

14. The surround view camera system as claimed in claim 12, wherein the processor is further configure to:
detect that the predetermined object is moving relative to a ground surface based on the perception data; and
generate surround view image data based on only the second image data without replacing the distorted object data when the predetermined object is detected as moving, the surround view image data corresponding to a surround view image of the surroundings of the vehicle including a live view of the moving predetermined object,
wherein the vehicle is operated to avoid the predetermined object based on the surround view image data.

15. The surround view camera system as claimed in claim 14, wherein the predetermined object is a pedestrian or a cyclist.

16. The surround view camera system as claimed in claim 12, wherein the processor is further configured to:
identify stationary objects of the plurality of objects that are stationary relative to a ground surface based on the perception data;
identify moving objects of the plurality of objects that are moving relative to the ground surface based on the perception data; and
generate the composite surround view image data by replacing the distorted object data with the non-distorted object data only when the distorted object data corresponds to an identified stationary object of the plurality of objects.

17. The surround view camera system as claimed in claim 10, wherein the processor is further configured to continually update the second image data, such that the composite surround view image includes (i) a live view of the surroundings of the vehicle based on the second image data, and (ii) a static past view of the predetermined object based on the first image data.

18. The surround view camera system as claimed in claim 10, wherein the processor is configured to generate the composite image data by:

forming a mask that corresponds to an area of the distorted object data in a surround view image formed from the second image data, the surround view image corresponding to a surround view of the surroundings of the vehicle; 5 inverting the mask to form an inverted mask;

forming first masked image data by applying the inverted mask to a historical surround view image formed from the first image data according to an AND operation to isolate the non-distorted object data, the historical 10 surround view image corresponding to a surround view of the surroundings of the vehicle;

forming second masked image data by applying the mask to the surround view image according to an AND operation to remove the distorted image object data; 15 and combining the first masked image data and the second masked image data according to an AND operation to generate the composite surround view image data.

19. The surround view camera system as claimed in claim 20 10, wherein:

the first imaging device is mounted on a front side of the vehicle or on a rear side of the vehicle, and the second imaging device mounted on a left side of the vehicle or on a right side of the vehicle. 25

20. The surround view camera system as claimed in claim 10, wherein the vehicle is operated in a forward direction or a reverse direction and the processor continues to generate the composite surround view image data.

* * * * * 30